US012319086B2

(12) United States Patent
Cemke, Jr. et al.

(10) Patent No.: US 12,319,086 B2
(45) Date of Patent: *Jun. 3, 2025

(54) CHALK REEL

(71) Applicant: Milwaukee Electric Tool Corporation, Brookfield, WI (US)

(72) Inventors: James A. Cemke, Jr., Hartford, WI (US); Alexander J. Paulsen, Milwaukee, WI (US); Joseph M. DeBaker, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,772

(22) Filed: Sep. 22, 2023

(65) Prior Publication Data

US 2024/0010025 A1 Jan. 11, 2024

Related U.S. Application Data

(63) Continuation of application No. 16/990,707, filed on Aug. 11, 2020, now Pat. No. 11,801,708, which is a (Continued)

(51) Int. Cl.

| | |
|---|---|
| ***B44D 3/38*** | (2006.01) |
| ***B65H 75/40*** | (2006.01) |
| ***B65H 75/44*** | (2006.01) |

(52) U.S. Cl.

CPC ............ *B44D 3/38* (2013.01); *B65H 75/406* (2013.01); *B65H 75/4431* (2013.01)

(58) Field of Classification Search

CPC .......................... B65H 75/406; B65H 75/4431

(Continued)

(56) References Cited

U.S. PATENT DOCUMENTS

| | | | |
|---|---|---|---|
| 2,589,500 | A | 3/1952 | Landon et al. |
| 3,438,595 | A | 4/1969 | Brown et al. |

(Continued)

FOREIGN PATENT DOCUMENTS

| | | | |
|---|---|---|---|
| CN | 2770981 | Y | 4/2006 |
| CN | 205219088 | U | 5/2016 |

(Continued)

OTHER PUBLICATIONS

International Search Report and Written Opinion for International Application No. PCT/US2019/017528, dated May 29, 2019, 14 pages.

*Primary Examiner* — George B Bennett

(74) *Attorney, Agent, or Firm* — Reinhart Boerner Van Deuren s.c.

(57) ABSTRACT

A chalk reel is provided that includes a handgrip on housing supporting a chalk line extending from a nozzle of the housing that extends from the chalk reel to mark a straight line. The chalk reel may further include a rotatable handle that rotates to extend or retract ("pay out") the chalk line. A hook is secured to the end of the chalk line to facilitate extension of the chalk line and prevent retraction of the chalk line end into the housing nozzle. The chalk reel may further include a transmission system with gearing and a selector to lock the gearing at locations around the handle rotation. The chalk reel may also include a large removable cap to facilitate refilling the chalk or other marking material.

20 Claims, 9 Drawing Sheets

Related U.S. Application Data continuation of application No. PCT/US2019/017528, filed on Feb. 11, 2019.

(60) Provisional application No. 62/629,325, filed on Feb. 12, 2018.

(58) Field of Classification Search
USPC .................................................... 33/413, 414
See application file for complete search history.

(56) References Cited

U.S. PATENT DOCUMENTS

| | | | | | |
|---|---|---|---|---|---|
| 4,022,398 | A | * | 5/1977 | Youngblood | B65H 75/406 242/395 |
| 4,272,036 | A | | 6/1981 | Watermann | |
| 4,660,291 | A | | 4/1987 | Dehn | |
| 5,068,970 | A | * | 12/1991 | Kunze | G01B 5/285 33/1 H |
| 6,745,485 | B2 | | 6/2004 | Shor | |
| 6,915,587 | B1 | | 7/2005 | Scillia et al. | |
| 6,957,495 | B1 | | 10/2005 | Schmillen | |
| 6,964,109 | B1 | | 11/2005 | Bond | |
| 7,707,734 | B2 | | 5/2010 | Alexander | |
| 8,882,016 | B1 | * | 11/2014 | Melvin | B65H 75/4492 242/405 |
| 9,511,975 | B2 | * | 12/2016 | Grenet | A43C 11/165 |
| 9,815,320 | B2 | | 11/2017 | Khangar et al. | |
| 10,071,594 | B2 | | 9/2018 | Chernyshou et al. | |
| 10,245,881 | B2 | | 4/2019 | Khangar et al. | |
| 10,264,852 | B2 | * | 4/2019 | Kim | A43C 11/165 |
| 10,507,689 | B2 | | 12/2019 | Nosek et al. | |
| D969,641 | S | * | 11/2022 | Hyma | B44D 3/38 D10/72 |
| 11,554,605 | B1 | | 1/2023 | Fox | |
| 11,801,708 | B2 | * | 10/2023 | Cemke, Jr. | B44D 3/38 |
| D1,046,655 | S | * | 10/2024 | Hyma | B44D 3/38 D10/72 |
| 2002/0194744 | A1 | | 12/2002 | Shor | |
| 2005/0076520 | A1 | | 4/2005 | Vary | |
| 2016/0052332 | A1 | | 2/2016 | DeLeo et al. | |
| 2016/0096396 | A1 | | 4/2016 | Khangar et al. | |
| 2016/0167425 | A1 | | 6/2016 | Chernyshou et al. | |
| 2017/0173997 | A1 | | 6/2017 | Nosek et al. | |
| 2022/0176733 | A1 | | 6/2022 | Wilson et al. | |
| 2022/0314085 | A1 | * | 10/2022 | Oh | B65H 75/4434 |
| 2023/0200356 | A1 | * | 6/2023 | Chen | B65H 75/406 119/796 |

FOREIGN PATENT DOCUMENTS

| | | | |
|---|---|---|---|
| DE | 1911932 | U | 3/1965 |
| EP | 2420388 | | 2/2012 |
| EP | 1543994 | B1 | 11/2012 |
| EP | 2420388 | B1 | 7/2013 |
| JP | 2010023226 | | 2/2010 |
| WO | WO2009/017663 | | 2/2009 |

* cited by examiner

CHALK REEL

CROSS-REFERENCE TO RELATED PATENT APPLICATIONS

The present application is a continuation of U.S. patent application Ser. No. 16/990,707, filed on Aug. 11, 2020, which is a continuation of International Application No. PCT/US2019/017528, filed Feb. 11, 2019, which claims the benefit of and priority to 62/629,325 filed on Feb. 12, 2018, which are incorporated herein by reference in their entireties.

BACKGROUND OF THE INVENTION

The present invention relates generally to the field of chalk reels and chalk lines. The present invention relates specifically to a chalk reel tool for marking straight lines. Chalk reels are useful for marking straight lines on a surface. Chalk reels may be used to lay out straight lines between two points at distances greater than would be practical by hand, e.g., with a straightedge.

SUMMARY OF THE INVENTION

One embodiment of the invention relates to a chalk reel. In various embodiments, the chalk reel includes a housing, a handle, a spool, a chalk line, a hook, and a selector. The housing includes an outer surface, an internal chamber, and an opening. The handle is located outside the outer surface of the housing. The handle rotates in a clockwise and/or counterclockwise direction about the outer surface. The handle can pivot toward the outer surface to lock the handle or away from the outer surface to rotate the handle. The spool is supported in the internal chamber of the housing. As the handle rotates, the spool is rotated about a central axis within the housing. Rotation of the handle and spool causes the chalk line to extend or retract from the chalk reel. The chalk line includes a first end that extends through the opening of the housing and a second end that is coupled to the spool. The hook is secured to the first end of the chalk line. The hook is located outside of the housing. The selector receives the handle as it pivots toward the outer surface in a plurality of positions about the axis. Pivoting the handle into the selector locks the handle within the plurality of positions and locks the spool about the central axis.

Another embodiment of the invention relates to a chalk reel. The chalk reel includes a housing, a handle, a spool, a chalk line, a hook, a refill port, and a removable cap. The housing further includes an outer surface, an internal chamber, and an opening. The handle is located outside the outer surface of the housing. The spool is supported in the internal chamber of the housing. Rotation of the handle located outside the housing rotates the spool within the housing. A chalk line is extracted or retracted from the chalk reel by rotation of the handle and/or spool. The chalk line includes a first end extending through the opening in the housing and a second end coupled to the spool. The hook is secured to the first end of the chalk line and located outside the housing. The refill port has a cam lock and provides access to the internal chamber of the housing. The removable cap includes a cam lock that couples to the cam portion of the refill port via engagement, such that the removable cap seals the internal chamber of the housing.

Another embodiment of the invention relates to a chalk reel. The chalk reel includes a housing, a marking material, a handle, a ring gear, a selector, a sun gear, a spool, a chalk line, a hook, and a fill port. The housing further includes an outer surface, an internal chamber, and an opening. The marking material is located and/or stored in the internal chamber of the housing. The handle is located outside the outer surface of the housing. When the handle is in a rotation position, the handle extends away from the outer surface of the housing and can rotate in a clockwise and/or counter-clockwise direction. When the handle pivots into a locked position towards the outer surface of the housing, the handle is restrained from rotating. The ring gear is coupled to the handle and rotates within the housing in the direction the handle rotates outside the housing. The selector receives the handle in a plurality of positions in the locked position. Pivoting the handle towards the outer surface of the housing and into the selector locks the handle within the selector in one of a plurality of positions. When the handle is locked in the selector, the spool is locked about the central axis. The sun gear is coupled to the ring gear, the intermeshing of the ring gear and the sun gear creates a gear ratio. The spool is supported in the internal chamber of the housing and meshed with or coupled to the sun gear. The handle rotates the ring gear meshed with the sun gear to rotate the spool within the housing. The chalk line extends or retracts from the chalk reel as the handle and spool are rotated. The chalk reel includes a first end extending through the opening in the housing and a second end coupled to the spool. The hook secured to the first end of the chalk line extending through the opening in the housing. The fill port has a cam lock to engage a cam portion of a cap. The fill port provides access to the internal chamber of the housing when the cap is removed. When the cap is secured the cap seals the fill port when the cam portion is engaged with the cam lock.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
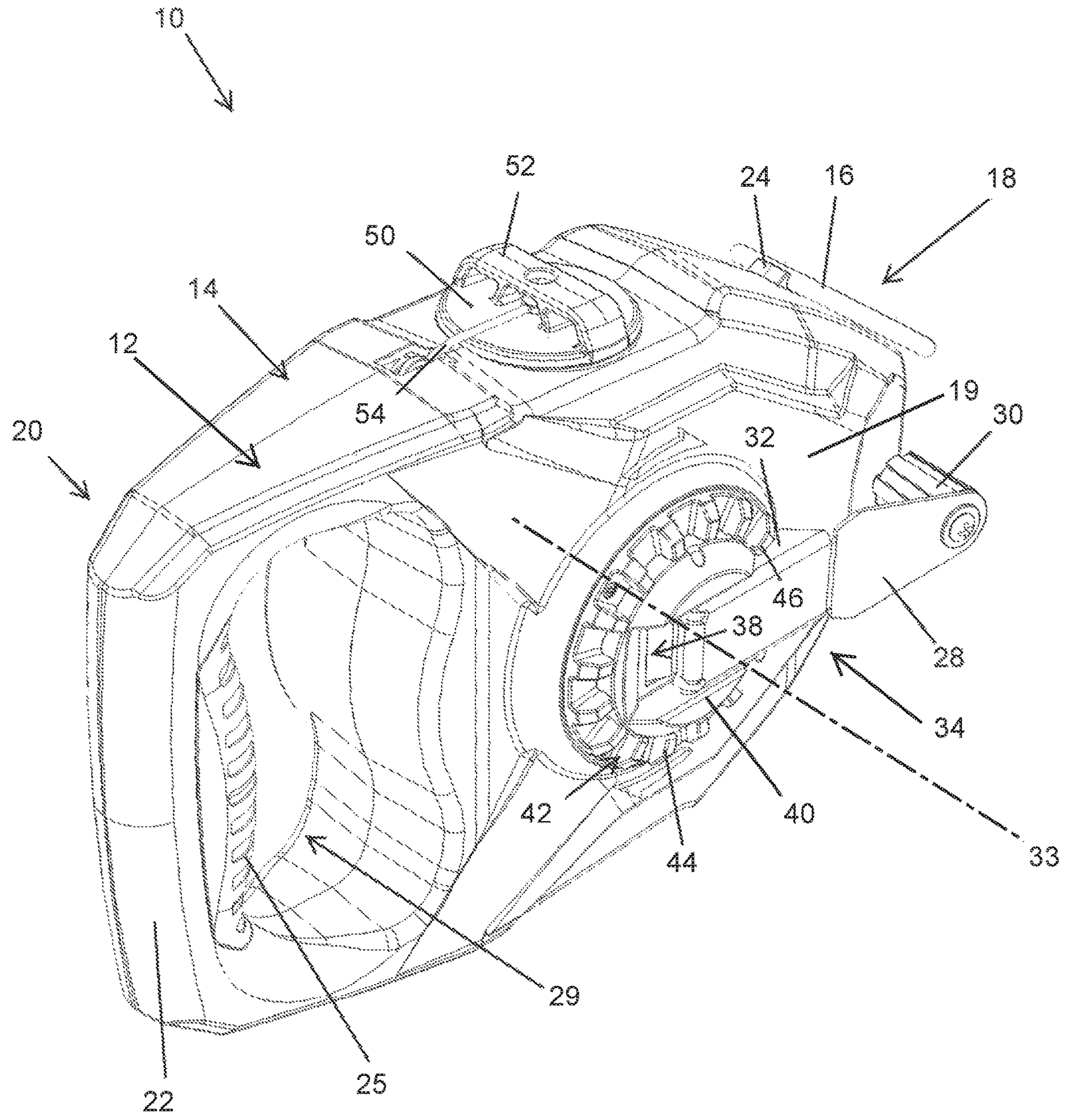
FIG. 1 is a rear perspective view of a chalk reel with a handle in a locked position and a cap in a closed position, according to an exemplary embodiment.

Referring generally to the figures, various embodiments of a chalk reel, for example, a large capacity chalk reel, are shown. Chalk reels are used in the construction and manufacturing trades to mark a straight line over materials at long distances. For example, a chalk reel may be used to mark a straight line in which to pour a concrete slab. In various embodiments, chalk reels include a handgrip formed within the housing and a chalk line extending from the housing to mark a straight line. The chalk reel may further include a handle that rotates about an axis of rotation to extend and/or retract the chalk line. A hook is secured to the end of the chalk line to facilitate extension of the chalk line and prevent retraction of the end of the line within the housing.

In some embodiments, the chalk reel, discussed herein, includes a selector encircling the handle at the axis of rotation and a removable cap to facilitate refilling the chalk reel with a marking material (e.g., chalk). As illustrated generally in the figures, the chalk reel may further include gearing to increase the rate of extraction or retraction of the chalk line from the chalk reel as the handle is rotated. In some embodiments, for each rotation of the handle, a one foot circumference pays out five feet of chalk line. For example, if each rotation of the spool pays out one foot of chalk line, each rotation of the handle pays out five feet of chalk line.

The handle is generally rotated about the axis of rotation until the chalk line extends from the chalk reel in a straight line. As the chalk line rotates through the housing, a marking material, such as chalk, embeds into the chalk line. With the chalk reel at one end and the hook at the other the chalk line extends over a target area in a straight line. The chalk line is then "snapped" or pulled taut by one or more operators on each end of the line to mark the straight line (e.g., on the ground). In this way, the chalk reel can mark a straight line over large distances and the gearing increases the rate of extraction or retraction of the chalk line from or into the chalk reel.

When the chalk line is snapped, the handgrip provides a firm surface for the operator to pull the chalk line taut. However, in order for the line to be pulled taut, the handle should be prevented from rotating when the operator pulls or snaps the handgrip. To prevent the handle from unwanted rotation that would extract chalk line from the chalk reel, a selector is used to lock the handle and the chalk line. In this way, when the chalk line is extended the desired distance the operator can lock the handle and use the handgrip to pull the chalk line taut and mark a straight line. In some embodiments, the selector includes a plurality of detents and/or protrusions to lock the handle in a variety of locations about the axis of rotation. In this way, the operator may lock the extended length of chalk line at a partial rotation of the handle. For example, if the chalk reel pays out five feet of chalk line for each full rotation, an additional foot of chalk line can be extended by rotating and locking the handle one fifth of a full revolution.

In some embodiments, the chalk reel includes a removable cap that provides an opening to an interior of the housing storing chalk or other marking materials. A tether couples the removable cap to the housing to prevent misplacement of the removable cap. The removable cap is otherwise completely detached from the housing, leaving a large opening for replenishing the chalk or other marking material within an internal chamber of the housing. In contrast to conventional chalk reel caps, the removable cap herein provides a larger unobstructed opening to refill a marking material (e.g., chalk) and a mechanism to create a fluid tight seal within the internal compartment of the housing.

Figure 2:
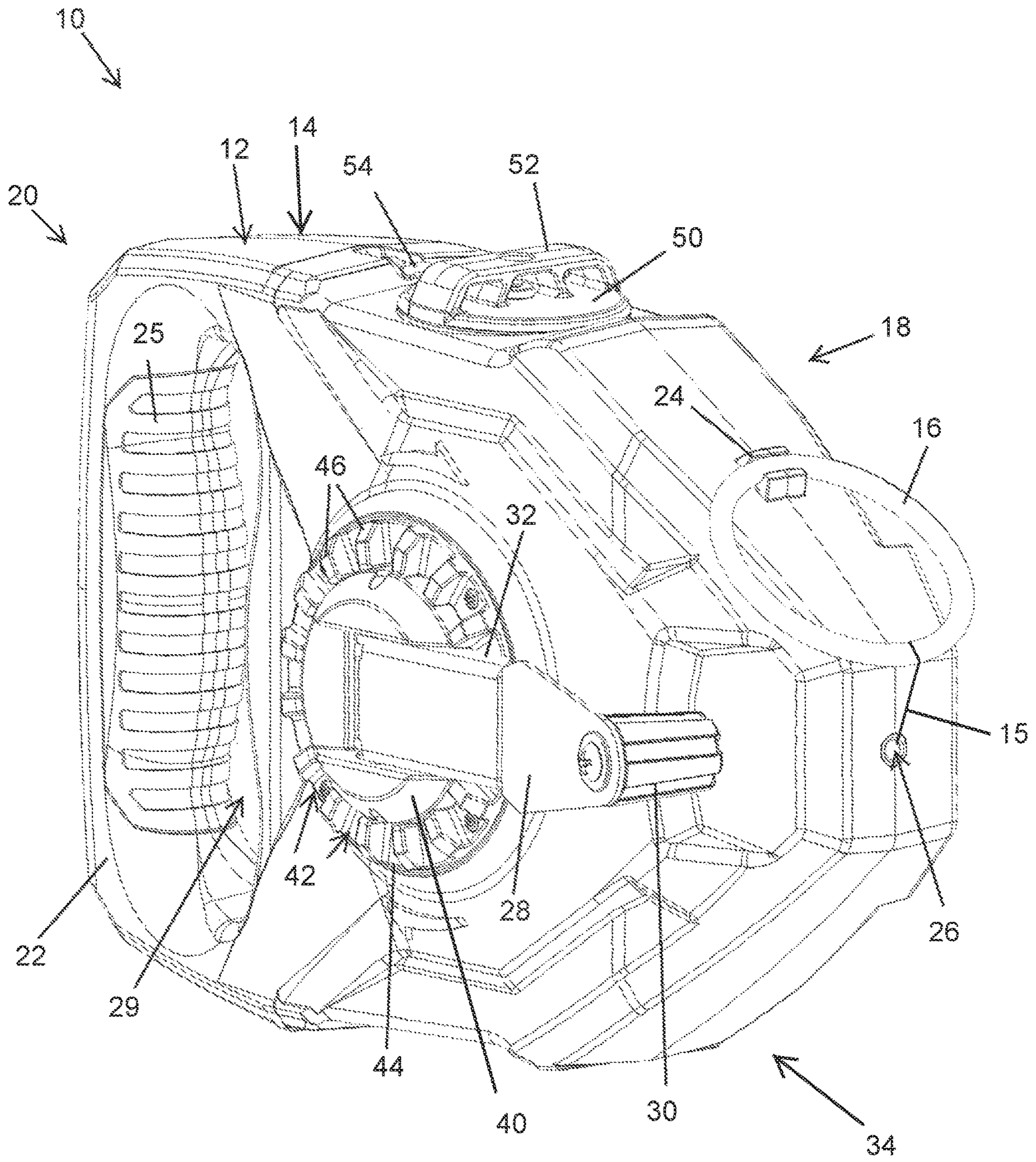
FIG. 2 is a front perspective view of the chalk reel device of FIG. 1 with the handle in a locked position and the cap in a closed position, according to an exemplary embodiment.

FIG. 1 shows a top perspective view of a chalk line device or chalk reel 10 from a rear of the chalk reel 10. FIG. 2 shows a side perspective view from a front of the chalk reel 10. FIGS. 1 and 2 illustrate chalk reel 10 that includes a first housing 12, a second housing 14, a chalk line 15, and a hook 16 secured to chalk line 15 on a front end 18 of chalk reel 10 opposite a back end 20 of chalk reel 10 including a handgrip 22. Hook 16 is removably positionable in a clip or hook retainer 24 to couple the hook 16 to first housing 12 and/or second housing 14. The chalk line 15 passes through a nozzle 26 (FIG. 2) positioned at a front end 18 of the first housing 12 and/or second housing 14. A handgrip 22 is positioned at a back end 20 of the housing 12 and/or 14, opposite the front end 18. Handgrip 22 includes an aperture 29 bounded by the first housing 12 and/or second housing 14 and a gripping segment 25 extending at least partially around the aperture 29. A handle 28 is disposed on a face of housing 12 and/or 14 between the front end 18 and back end 20. Handle 28 is rotatable relative to the housing 12 and/or 14 about a central or rotational axis 33 passing through housing 12 and 14. A knob 30 is disposed at an end of the handle 28. A pair of tabs 32 on either side of the handle 28 extend in substantially the same direction as knob 30.

In addition to rotating about rotational axis 33, handle 28 may also pivot from a locked position 34 to a rotation position 36 and from a rotation position 36 back to a locked position 34. Best illustrated in FIG. 7, handle 28 extends away from ring gear 40 in the rotation position 36. Handle 28 rotates about the rotational axis 33 in the rotation position 36 to rotate the spool 66. The rotation of handle 28 in a first direction rotates the spool 66 to roll off, extend, or pay out chalk line 15. Rotation in the second or opposite direction winds the chalk line 15 onto spool 66 and retracts the chalk line 15. Pivoting handle 28 from the rotation position 36 to the locked position 34 abutting ring gear 40, prevents rotation of spool 66 and the associated extension or retraction of the chalk line 15.

Handle 28 is located outside outer surface 19 of housing 12 and/or 14. In the rotation position 36, handle 28 is configured to rotate in a clockwise and/or counterclockwise direction on the outer surface 19 to rotate spool 66. In locked position 34 the handle pivots towards the outer surface 19 of housing 12 and/or 14 and couples to a selector 44.

Figure 7:
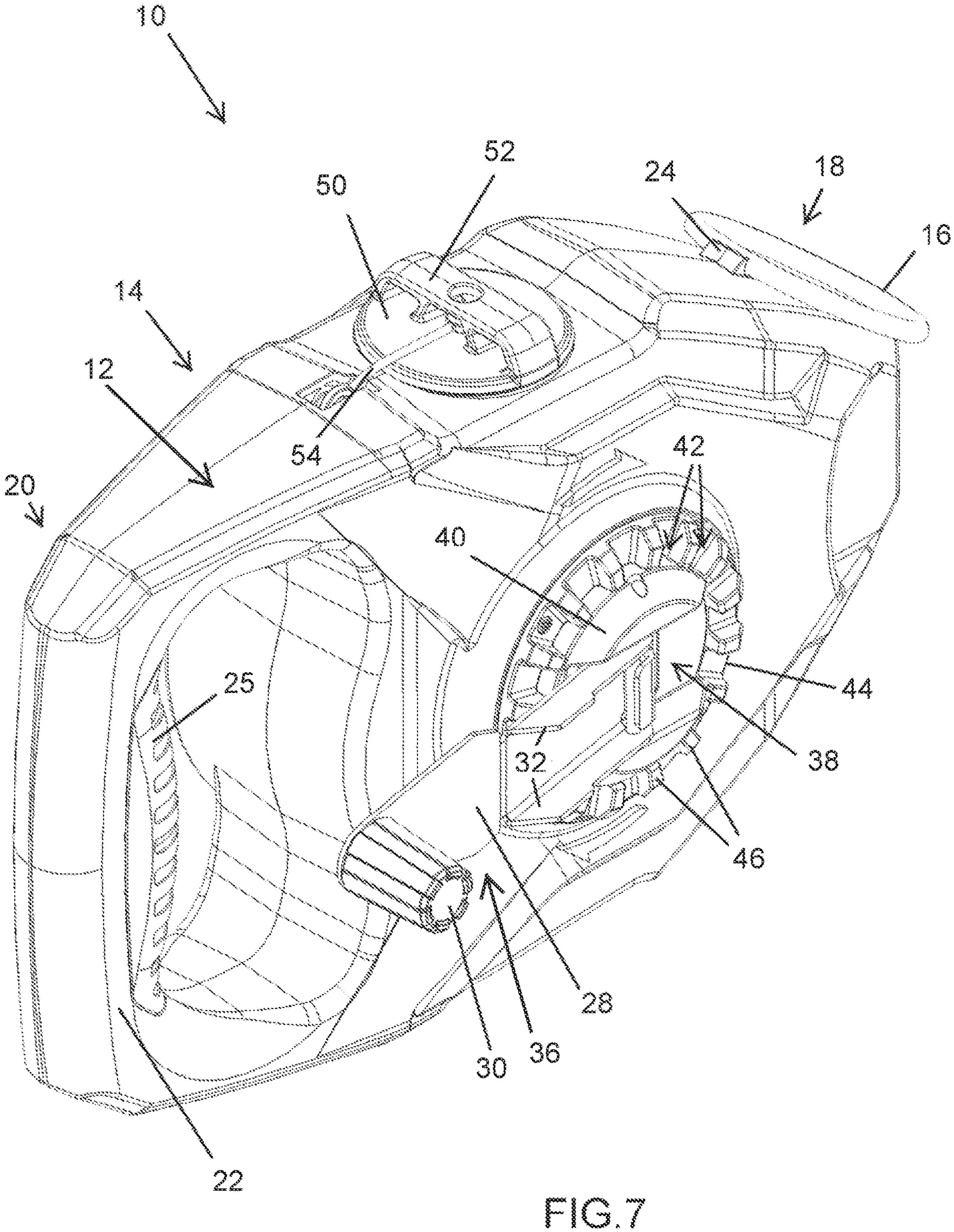
FIG. 7 is a perspective view of the chalk reel device of FIG. 1 with the handle in a rotating position, according to an exemplary embodiment.

Handle 28 pivots from a locked position 34 (FIG. 1) to a rotation position 36 (FIG. 7). With reference to FIGS. 1 and 2, when handle 28 pivots from the locked position 34 into a slot 38 in the rotation position 36, sides of handle 28 are captured within the slot 38 to apply rotational pressure as handle 28 is rotated. In the rotation position 36, handle 28 rotates a ring gear 40 centered within a lock gear or selector 44 coupled to first housing 12 and/or second housing 14. Handle 28 is coupled to ring gear 40 and rotates about rotational axis 33 within a selector 44. For example, ring gear 40 rotates within housing 12 and/or 14 in the direction of the handle 28 rotation (clockwise and/or counterclockwise relative to outer surface 19 of housing 12 and/or 14).

Selector 44 includes a plurality of locking locations for handle 28 about ring gear 40. For example, selector 44 includes detents 42 and projections 46 to lock handle 28 in a plurality of locked positions 34 following complete or partial rotations of handle 28 about rotational axis 33. Ring gear 40 rotatably couples to the selector 44 to form a plurality of detents 42 that receive the handle 28 within one of the detents 42 to secure the handle 28 at an angular position in the locked position 34. Selector 44 receives handle 28 in a plurality of positions about the central rotational axis 33, such that pivoting handle 28 towards outer surface 19 of housing 12 and/or 14 and into selector 44 locks handle 28 within the detents 42 and/or projections 46 to form a plurality of positions about axis 33 to lock spool 66.

In other embodiments, ring gear 40 is stationary and a carrier gear that is coupled to planetary gears 62 rotates within ring gear 40 and selector 44. For example, the rotation of the handle drives planetary gears 62 to rotate within ring gear 40. Rotation of planetary gears 62 meshes with sun gear 64 to drive rotation of spool 66. The gear system is not meant to be limiting, any other suitable gearing system or mechanical advantage system may be used to generate a gear ratio.

FIGS. 1 and 2 also show a removable cap 50. Removable cap 50 includes a grip portion 52 to facilitate rotation of the removable cap 50 within first housing 12 and second housing 14. For example, an operator grips the grip portion 52 of removable cap 50 and rotates removable cap 50 in a first direction (e.g., counterclockwise) to remove and/or disengage removable cap 50 from the chalk reel 10 and in a second direction (e.g., clockwise) to secure removable cap 50 to the chalk reel 10. Removable cap 50 can be removed from the opening 92 defined in first housing 12 and second housing 14 of chalk reel 10. To prevent misplacement of removable cap 50 a tether 54 may attach removable cap 50 to first housing 12 and/or second housing 14. For example, tether 54 includes a first end coupled to the removable cap 50 and a second end coupled to another component of the chalk reel 10, such as first and/or second housing 12 and/or 14.

Figure 3:
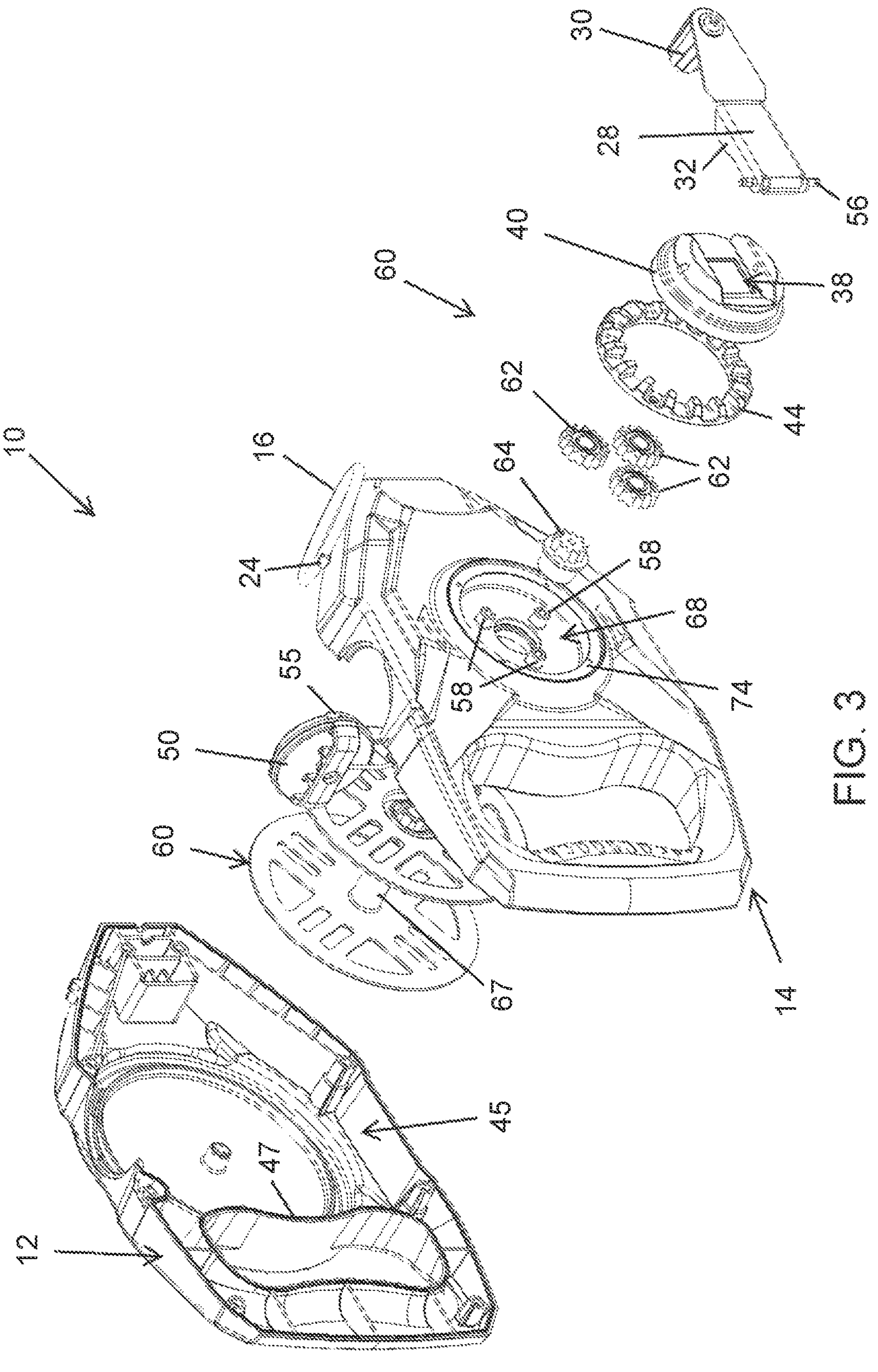
FIG. 3 is an exploded view of the chalk reel device of FIG. 1, according to an exemplary embodiment.
Figure 4:
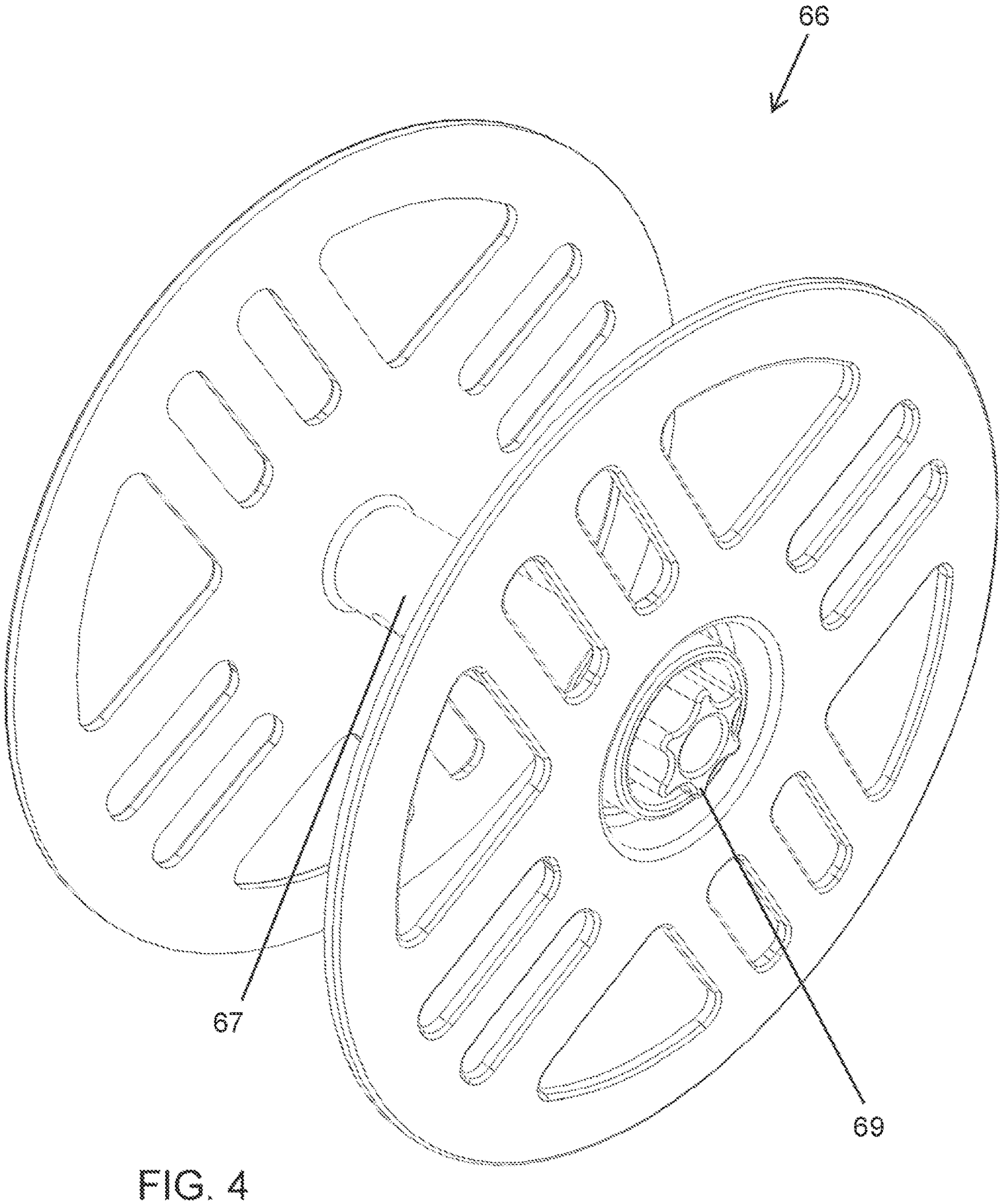
FIG. 4 is a perspective view of a spool of the chalk reel device of FIG. 1, according to an exemplary embodiment.

As shown in FIG. 3, chalk reel 10 includes a first housing 12 and a second housing 14 coupled together to define an internal chamber 45. A spool 66 is supported for rotation within the first housing 12 and second housing 14 and is in communication with the internal chamber 45. In the illustrated embodiment, a partition wall 47 separates the handgrip 22 from the internal chamber 45. The chalk line 15 is wrapped onto a support surface 67 of the spool 66. The spool 66 includes a spool gear 69 (FIG. 4). In the illustrated embodiment, the spool gear 69 is concentric with an axis of rotation of the spool 66.

Figure 5:
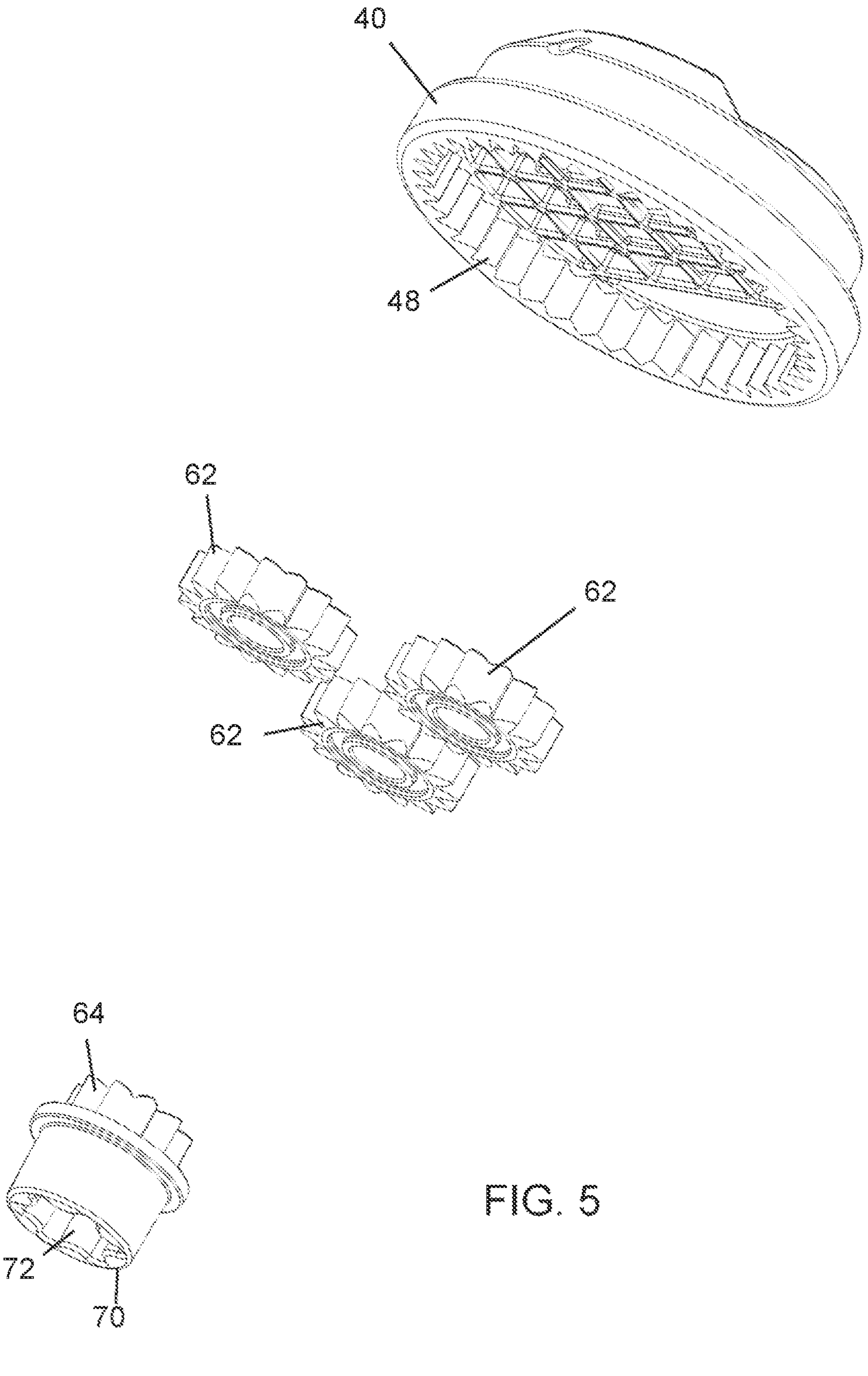
FIG. 5 is a detailed perspective view of component parts in a transmission of the chalk reel device of FIG. 1, according to an exemplary embodiment.

Referring to FIGS. 3 and 5, the chalk reel 10 further includes a transmission 60. The transmission 60 transmits torque applied on the handle 28 by a user to rotate the spool 66 supporting the wound chalk line 15. In the illustrated embodiment, the transmission 60 is a planetary gear drive system that includes a ring gear 40, three planet gears 62, and a sun gear 64 coupled to the spool 66. The ring gear 40 includes internal teeth 48 (FIG. 5) and slot 38 for engaging a post 56 connected to the handle 28. Post 56 secures handle 28 within ring gear 40 to ensure that the sides of handle 28 engage the sides of ring gear 40 in order to rotate ring gear 40 as handle 28 is rotated. In some embodiments, handle 28 and ring gear 40 are a single integral part. In the illustrated embodiment, the ring gear 40 is coupled to handle 28 to rotate ring gear one full rotation for each revolution of handle 28. Other configurations can make the ring gear 40 rotate any multiple of times for each revolution of handle 28. For example, ring gear 40 may rotate 1.5, 2, 2.5, 3, 4, or more times for each revolution of handle 28 with the use of gearing between handle 28 and ring gear 40.

In the illustrated embodiment, post 56 ends extend orthogonally to the first and/or second housing 12 and/or 14 into slot 38 to couple handle 28 to ring gear 40 within slot 38. Pins 58 provide a support anchor to position planet gears 62 on an external surface of first housing 12 (or second housing 14). In this configuration, teeth of planet gears 62 are intermeshed between the internal teeth 48 of ring gear 40 and the teeth of sun gear 64. Sun gear 64 is coupled to spool 66. Ring gear 40 and sun gear 64 are coupled through gearing and are both concentric and centered on rotational axis 33 for spool 66.

In other embodiments, handle 12 couples to the planetary gears 62 that rotate about ring gear 40 and selector 44 (e.g., via a carrier gear). In the illustrated embodiment, planet gears 62 are supported on pins 58 coupled to a retainer plate 68 (FIG. 3). The retainer plate 68 is fixed to the first housing 12 and/or second housing 14 and each planet gear 62 rotates about a pin 58. In other embodiments, the retainer plate 68 is movable relative to the first housing 12 and/or second housing 14. Retainer plate 68 rotates relative to the ring gear 40 to permit revolution of the planet gears 62 around the sun gear 64. Engagement of one or more gears intermeshed between the ring gear 40 to the sun gear 64 provides a gear ratio. The gear ratio relates one rotation of handle 28 to multiple rotations of spool 66. The gear ratio converts one full rotation of the handle into more than one or multiple rotations of the spool. In some embodiments, the gear ratio from the ring gear 40 to the sun gear 64 is 4.1:1, such that the spool 66 rotates 4.1 times for each full revolution of handle 28. In other embodiments, the gear ratio from the planetary gears 62 to the sun gear 64 is 4.1:1, such that the spool 66 rotates six times for each full revolution of handle 28. In other words, gearing between handle 28 and spool 66 have a gear ratio (4.1:1) that pays out 4.1 times the circumference of spool 66 for each rotation of the carrier gear, handle 28, and/or ring gear 40.

In other embodiments, the gear ratio may be higher or lower. For example, in various embodiments, the gear ratio is greater than 1:1, 2:1, 3:1, 4:1, 4.1:1, 4.2:1, 4.3:1, 4.4:1, 4.5:1, 4.6:1, 4.7:1, 4.8:1, 4.9:1, 5:1, 6:1, 7:1, 8:1, 9:1, or 10:1. In various embodiments, the gear ratio is between 2:1 and 10:1, and more specifically is between 3:1 and 6:1. In some embodiments, the gear ratio is between 4:1 and 5:1. Applicant believes that the gear ratios and gear ratio ranges discussed herein provide a provide a more rapid extension or retraction of the chalk line 15 from the chalk reel 10 and provide a mechanical mechanism to lock or secure the spool 66 supporting chalk line 15 in the chalk reel 10 to mark a line.

In the illustrated embodiment, the sun gear 64 is formed integrally with an engagement gear 70. In some embodiments, sun gear 64 is formed integrally with spool 66. In other embodiments, the sun gear 64 is formed separately from the engagement gear 70 and/or spool 66. The engagement gear 70 includes internal teeth 72 that fit around the spool gear 69 (FIG. 4). Joining the engagement gear 70 and the spool gear 69 creates a drive connection between the spool 66 and the sun gear 64. The internal teeth 72 of the engagement gear 70 lock onto the spool gear 69 and prevent relative motion between the spool 66 and the sun gear 64.

A selector 44 is disposed around the ring gear 40. In the illustrated embodiment, the selector 44 is ring shaped and has an inner diameter approximately equal to the diameter of the ring gear 40. In other words, there is no gap between the selector 44 and the ring gear 40 while the ring gear 40 and selector 44 are coupled to housing 12 and/or 14. Selector 44 secures to a lip or projection 74 encircling retainer plate 68. Projection 74 extends radially inward toward the rotation axis 33 beyond an outer surface 19 of the first housing 12 and/or second housing 14.

Figure 6:
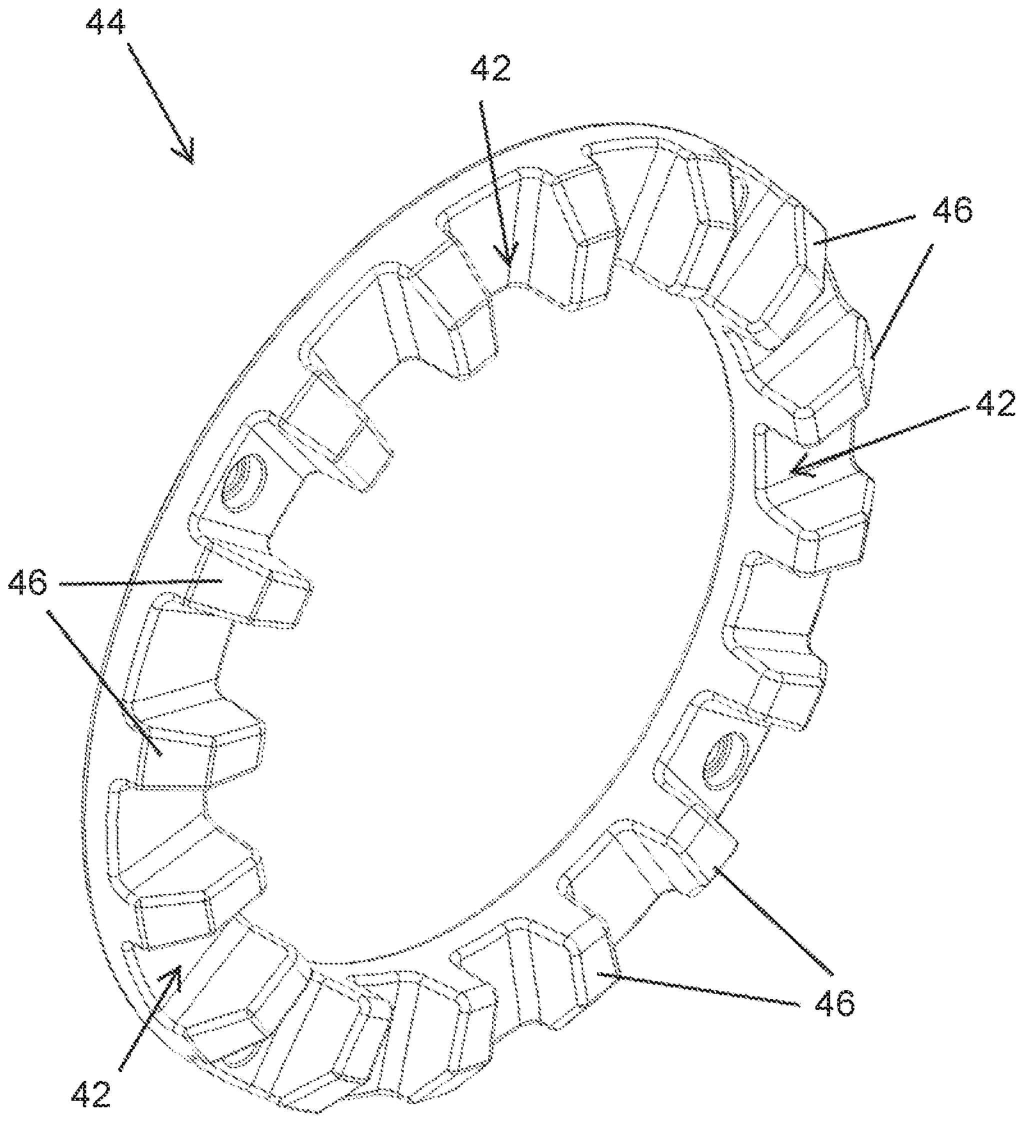
FIG. 6 is a perspective view of a lock gear of the chalk reel device of FIG. 1, according to an exemplary embodiment.

FIG. 6 shows an isolated view of selector 44. Projections 46 are evenly spaced around a circumference of selector 44. A recess or detent 42 is disposed between every two adjacent projections 46. As described above, as handle 28 is rotated about the rotational axis 33, tabs 32 on handle 28 align within detents 42 of selector 44 to lock handle 28 in any one of a plurality of locked positions 34. This configuration enables handle 28 to be locked in a partial or incomplete revolution about the rotational axis 33.

As shown in FIG. 7, the handle 28 is moved into an operating or rotation position 36 by the pivoting handle 28 about the post 56 so that the knob 30 is spaced apart from the first housing 12 and/or second housing 14. In other words, the knob 30 and the tabs 32 extend away from the first housing 12 and/or second housing 14 while the chalk reel 10 is in rotation position 36. A user may insert their hand through the aperture 29 and grasp the gripping segment 25 of the handgrip 22 with one hand and may grasp the handle 28 with their other hand. Rotation of the handle 28 in the rotation position 36 drives the planetary gear drive. The internal teeth 72 of the engagement gear 70 fit within the teeth of the spool gear 69 (FIG. 3). The rotation of the sun gear 64 causes the spool 66 to rotate due to the interface of the engagement gear 70 and the spool gear 69. The rotation position 36 allows the spool 66 to rotate so that the chalk line 15 may extend out of or be reeled into the first housing 12 and/or second housing 14.

Returning to FIG. 1, the handle 28 is moved into a second or locked position 34 by pivoting handle 28 about post 56 so that knob 30 is adjacent housing 12 or 14. In other words, knob 30 and tabs 32 extend toward the first housing 12 and/or second housing 14. Handle 28 pivots approximately 180 degrees between an operating or rotation position 36 (FIG. 7) and the locked position 34. While in the locked position 34, each tab 32 rests in one of the plurality of detents 42. In the illustrated embodiment, the tabs 32 rest in adjacent detents 42. The selector 44 is secured to the first housing 12 and/or second housing 14 and does not rotate with the planetary gear drive (FIG. 3). Thus, while tabs 32 are positioned within respective detents 42, projections 46 on either side of the detents 42 prevent handle 28 from rotating about rotational axis 33 of spool 66 (FIG. 3). Projections 46 lock handle 28 in place to prevent transmission 60 (e.g., the planetary gear drive) from rotating. When handle 28 is in the locked position 34, transmission 60 is prevented from rotating because handle 28 is locked, this in turn prevents rotation of spool 66 and prevents further extraction or retraction of the chalk line 15 from chalk reel 10. In the locked position 34, chalk line 15 will not move into or out of nozzle 26 of housing 12 and 14. This allows a user to keep a constant length of chalk line 15 extended from chalk reel 10. The locked position 34 also allows a user to securely store the chalk line 15 within the internal chamber 45 of chalk reel 10.

In some embodiments, chalk reel includes removable cap 50. Removable cap 50 is positioned on a face or surface of housing 12 and/or 14 between the front end 18 and back end 20. Removable cap 50 is generally on a surface of housing 12 and/or 14 that is orthogonal to a housing 12 and/or 14 surface that includes handle 28. The removable cap 50 includes a grip portion 52 disposed on a surface of the removable cap 50. A cable or tether 54 is coupled between the removable cap 50 and the first and/or second housing 12 and/or 14.

Figure 8:
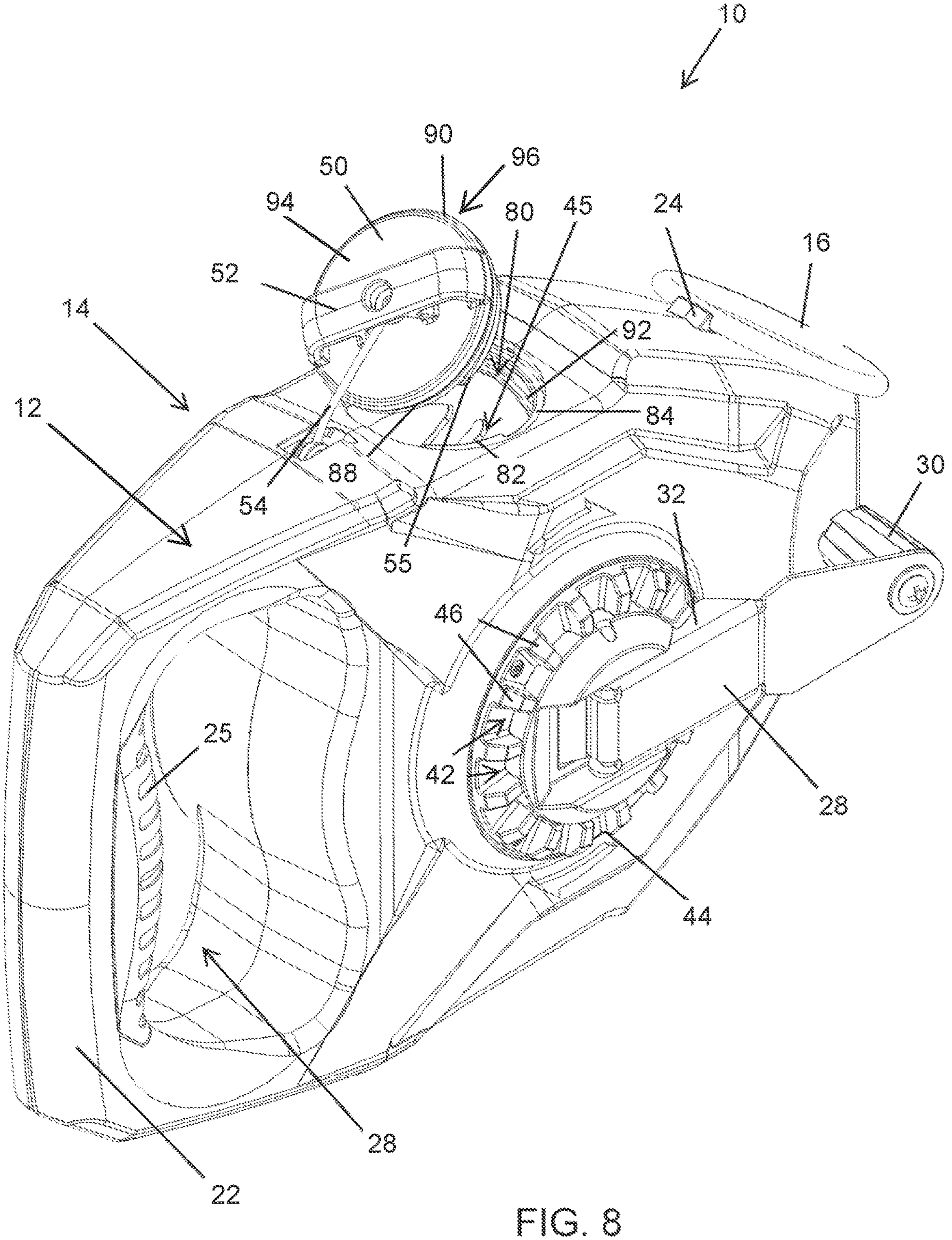
FIG. 8 is a perspective view of the chalk reel device of FIG. 1 with the cap in a second position, according to an exemplary embodiment.

FIGS. 1 and 8 illustrate various components of one embodiment of chalk reel 10. Chalk reel 10 includes housing 12 and/or 14 that forms an internal chamber 45 and an opening to internal chamber 45. Handle 28 is located outside the outer surface 19 of housing 12 and/or 14 and rotates about rotational axis 33. Housing 12 and/or 14 capture spool 66 (FIGS. 3-4) and support spool 66 along rotational axis 33 of internal chamber 45 formed by the coupling of first housing 12 and/or second housing 14. A chalk line 15 extends through an opening or nozzle 26 in the housing 12 and/or 14 and is connected or coupled to spool 66 at a second end. A hook 16 located outside the housing 12 and/or 14 is connected to the first end of the chalk line 15. As a user rotates handle 28 to extend the chalk line 15, one or more gears increase the amount of chalk line 15 paid out. When the user has the desired amount of chalk line 15 extended from the chalk reel 10, one or more detents 42 and projections 46 on selector 44 enable the user to lock handle 28 in a locked position 34 for any partial rotation of handle 28. Selector 44 locks handle 28 at a plurality of positions about the rotational axis 33 to lock and prevent spool 66 from rotating about the rotational axis 33.

FIG. 8 illustrates additional features of removable cap 50, when the removable cap 50 is removed. Removable cap 50 covers an aperture, fill port, and/or refill port 80 in the first housing 12 and/or second housing 14. The refill port 80 has a first diameter 82 and a second diameter 84 larger than the first diameter 82. In a first or closed position (FIG. 1), the removable cap 50 is positioned in the refill port 80 and secured to the first housing 12 and/or second housing 14. The removable cap 50 provides a fluid seal 138 between internal chamber 45 (FIG. 3) of the first housing 12 and/or second housing 14 and an external environment. The fluid seal 88 blocks fluid communication between the internal chamber 45 and the external environment while the removable cap 50 is positioned within the refill port 80.

As shown in FIG. 8, the grip portion 52 of the removable cap 50 is rotated in a second or open position (e.g., counterclockwise). The removable cap 50 includes a cam portion 90 with a cam 55 that engages a cam lock 92 of the refill port 80. The cam 55 is larger than the first diameter 82 and smaller than the second diameter 84. In the illustrated embodiment, a user may grasp the grip portion 52 and rotate the removable cap 50 one quarter revolution (i.e., 90 degrees) in a first direction to disengage the cam portions 90 and 92 and allow the cam 55 to pass through the second diameter 84 of the refill port 80. In other embodiments, the user may rotate the removable cap 50 a greater or lesser number of degrees. Once the removable cap 50 disengages from the first housing 12 and/or second housing 14, the user may move removable cap 50 away from the refill port 80. The tether 54 keeps the removable cap 50 tethered to the first housing 12 and/or second housing 14. In other words, tether 54 prevents a user from moving the removable cap 50 apart from housing 12 and/or 14. Tether 54 prevents inadvertent loss of removable cap 50.

The refill port 80 is in communication with the internal chamber 45. With the removable cap 50 disengaged from the refill port 80, a user may fill or refill the internal chamber 45 with chalk or another marking material. Partition wall 47 prevents chalk from filling inside of handgrip 22. The user then repositions removable cap 50 in refill port 80 so that cam 55 is aligned with the second diameter 84. The user can then engage grip portion 52 and rotate cap 50 in a second direction to reengage the cam portions 90 and 92 and position the cam 55 proximate the first diameter 82. The user thereby reengages removable cap 50 with the first housing 12 and/or second housing 14.

Cam 55 enables smaller rotations to completely seal or disengage removable cap 50. For example, rotating removable cap 50 fitted with cam 55, may only require one quarter revolution (e.g., 90°) in a first direction to disengage cam 55 from the cam lock 92 of refill port Rotating removable cap 50 one quarter revolution (e.g., 90°) in a second direction the first direction, may engage cam 55 with the cam lock 92 of refill port 80. Other angles of rotation are contemplated. For example, cam 55 may engage or disengage removable cap 50 through a rotation of 15°, 20°, 30°, 40°, 45°, 50°, 60°, 70°, 80°, 90°, 100°, 110°, or 120°.

In some embodiments, refill port 80 includes a cam lock 92 to receive the cam portion of the removable cap 50. For example, removable cap 50 includes cam features (e.g., detents or protrusions) on cam portion 90 to couple to refill port 80 via engagement of the cam features on cam lock 92. In this way, the removable cap 50 may be removed to provide access to the internal chamber 45 of housing 12 and 14. When removable cap 50 is removed from the cam lock 92, the opening may be used to refill marking material such as chalk. Opening 92 may also provide access to internal chamber 45. When the cam portion 90 of removable cap 50 is engaged with the cam lock 92, the removable cap 50 seals the internal chamber 45 of the housing 12 and/or 14. In some embodiments, the removable cap 50 provides a fluid tight seal 88.

Removable cap 50 may include a cover coupled to cam portion 90. For example, the cover may have an exterior surface 94 and a sealing surface 96. An O-ring fluid tight seal 88 abuts sealing surface 96 of removable cap 50 and surrounds cam portion 90 adjacent to sealing surface 96. In this way, when removable cap 50 is engaged with the cam lock 92, the O-ring fluid tight seal 88 creates a fluid tight seal 88 along the cam lock 92 when the removable cap 50 is coupled to the refill port 80.

Similarly, the refill port 80 can include a gasket seal (not shown) in the cam lock 92. Gasket seal may fit within the larger second diameter 84 and be captured between the first diameter 82 and second diameter 84 of the refill port 80. Gasket seal is captured between the second diameter 84 and the removable cap 50 when the cam portion 90 is engaged with the cam lock 92 of the refill port 80. The gasket seal creates a fluid tight seal 88 along the removable cap when removable cap 50 is coupled to refill port 80.

In some embodiments, the cam lock 92 of refill port 80 is circular. In some embodiments, cam portion and cam lock 92 are threaded, such that threads of cam lock 92 threadedly couple to threads of circular cam portion 90 of removable cap 50. Chalk reel 10 includes a broader refill port 80 (e.g., a refill port 80 with a large diameter) to facilitate replenishing a marking material. Specifically, the diameter of refill port 80 is 0.25 in. or larger. For example, the diameter of refill port 80 is greater than 0.25 in., 0.5 in., 0.75 in., 1 in., 1.25 in., 1.5 in., 1.75 in., 2 in., 2.25 in., 2.5 in. or larger. In various embodiments, the refill port 80 has a diameter of between 0.25 in. and 2.5 in. In other embodiments, the diameter is between 1 in. and 2 in. In further embodiments, the diameter is between 1.25 in. and 1.75 in.

Figure 9:
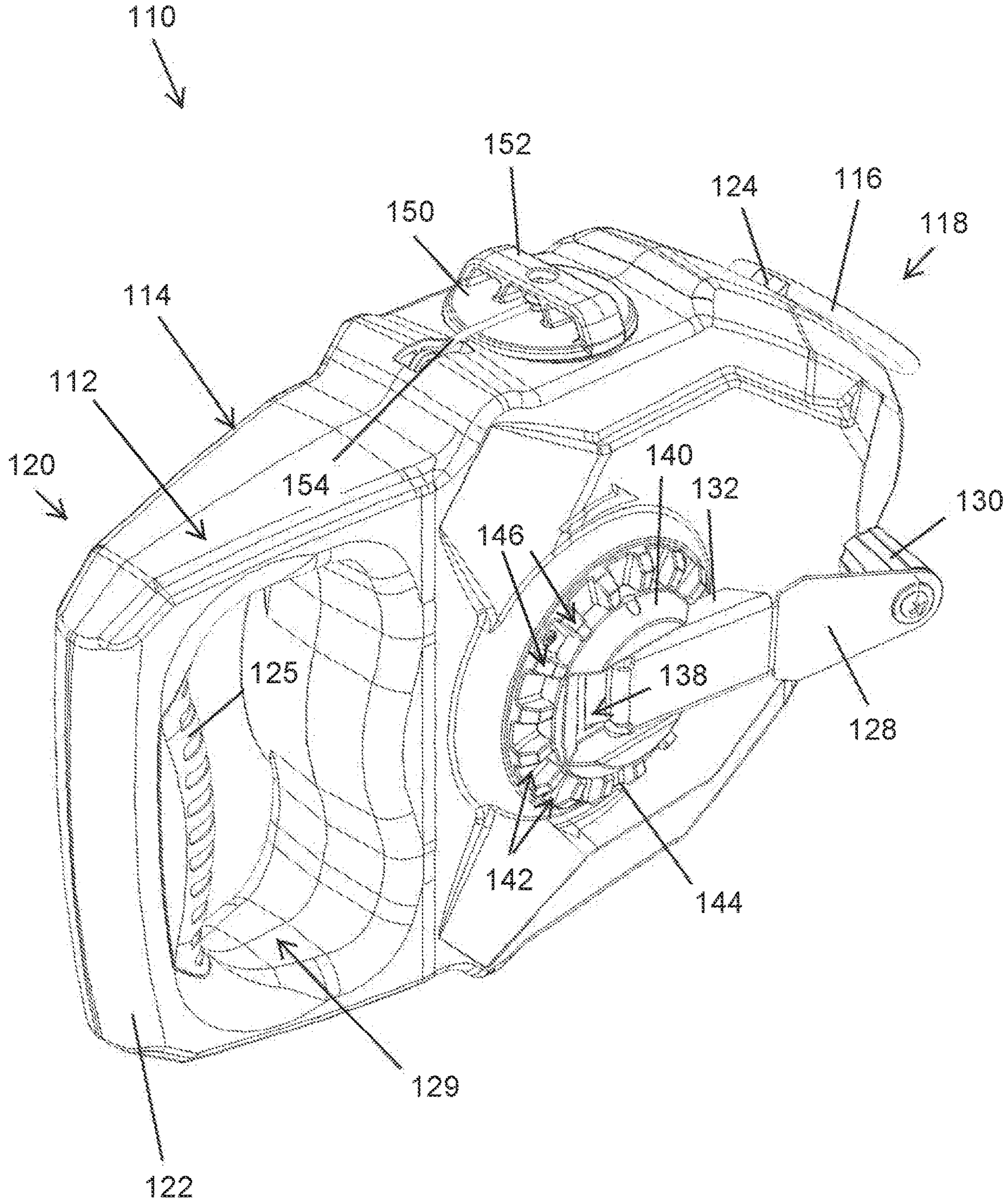
FIG. 9 is a perspective view of a chalk reel device, according to another embodiment.

The embodiment of FIG. 9 is substantially the same as or similar to the embodiment of FIGS. 1-7 except for the differences described. In contrast to the design of chalk reel 10, the chalk reel 110 of FIG. 8 is larger to facilitate measuring longer distances with a longer chalk line 15. Similar components of chalk reel 110 are identified by the same reference numbers as chalk reel 10 incremented by 100.

Chalk reel 110 includes a first housing 112 coupled to a second housing 114. A hook 116 extends from a front end 118 of chalk reel 110 and is removably coupled to housing 112 and/or 114 by hook retainer 124. The back end 120 of the chalk reel 110 includes a handgrip 122 with gripping segment 125. Handle 128 rotates about rotational axis 133 (not shown) to extend or retract chalk line 15. Handle 128 pivots from a locked position 134 (shown) to a rotation position 136 (not shown). A spool 166 (not shown) housed within chalk reel 110 is larger than spool 66 (FIG. 3) housed in chalk reel 10. Thus, a longer length of chalk line 15 can be spooled on spool 166 of chalk reel 110 compared to spool 66 of chalk reel 10. In addition, the larger size of chalk reel 110 enables a larger removable cap 150. For example, the diameter of removable cap 150 of chalk reel 110 may be greater than 2 in., such as 2 in., 2.25 in., 2.5 in., 2.75 in., 3 in., or more.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A chalk reel comprising:

a housing comprising an outer surface, an internal chamber, a central axis, and an opening;

a handle configured to rotate in a clockwise direction and a counterclockwise direction about the central axis;

a spool;

a chalk line comprising a first end extending through the opening in the housing and a second end coupled to the spool; and a selector that receives the handle in a plurality of positions;

wherein rotating the handle about the central axis rotates the spool;

wherein, when the handle is received by the selector in any one of the plurality of positions, the handle is prevented from rotating about the central axis.

2. The chalk reel of claim 1, wherein, for each full rotation of the handle, the spool rotates more than one full rotation.

3. The chalk reel of claim 1, wherein the handle pivots from a rotation position to a locked position, wherein the handle rotates in the rotation position to rotate the spool which in turn causes the chalk line to pay out from or wind on to the spool and wherein, when the handle is in the locked position, rotation of the spool is prevented.

4. The chalk reel of claim 1, further comprising a ring gear, a sun gear, and two or more planet gears intermeshed between the ring gear and the sun gear, the sun gear being coupled to the spool, the ring gear and sun gear being concentric and centered on the central axis.

5. The chalk reel of claim 1, wherein the selector couples to a ring gear coupled to the handle, the selector comprising a plurality of locking locations for the handle about the ring gear that lock the handle into one of the plurality of positions.

6. The chalk reel of claim 5, further comprising a hook secured to the first end of the chalk line;

wherein the handle and the ring gear are a single integral part.

7. The chalk reel of claim 5, further comprising a sun gear coupled to the spool and engaged with the ring gear coupled to the handle, the engagement of the ring gear to the sun gear providing a gear ratio that relates one rotation of the handle to multiple rotations of the spool.

8. The chalk reel of claim 5, wherein the handle is pivotable and pivots from a rotation position to a locked position, wherein the handle extends away from the ring gear in the rotation position, and wherein the ring gear couples to the selector to form a plurality of detents that receive the handle within one of the detents to secure the handle at an angular position about the central axis with respect to the housing in the locked position.

9. The chalk reel of claim 8, wherein the handle further includes tabs projecting from the handle and a knob at a distal end to facilitate rotation of the handle, and wherein the selector comprises projections adjacent to the detents, the projections and detents of the selector configured to receive the tabs of the handle in a locked position.

10. A chalk reel comprising:

a housing comprising an outer surface, an internal chamber, a first opening, and a second opening;

a spool;

a handle, the handle configured to rotate the spool;

a chalk line comprising a first end extending through the opening in the housing and a second end coupled to the spool;

a cam lock located in the second opening, the second opening providing access to the internal chamber; and a removable cap comprising a cam portion configured to couple to the cam lock, wherein engagement of the cam lock to the cam portion of the removable cap seals the second opening.

11. The chalk reel of claim 10, further comprising:

a tether comprising a first end coupled to the removable cap and a second end coupled to the housing; and a hook secured to the first end of the chalk line.

12. The chalk reel of claim 10, wherein the cam lock and the cam portion of the removable cap are circular and each have a diameter of between 0.25 in. and 2 in.

13. The chalk reel of claim 10, wherein the removable cap comprises an exterior surface and a sealing surface, wherein an O-ring seal abuts the sealing surface of the removeable cap and surrounds the cam portion adjacent to the sealing surface to create a fluid tight seal along the cam lock when the removable cap is coupled to cam lock.

14. The chalk reel of claim 10, wherein an outer surface of the second opening includes a gasket seal surrounding the cam lock, wherein the gasket seal is configured to create a fluid tight seal along the cam portion of the removable cap when the removable cap is coupled to the cam lock.

15. The chalk reel of claim 10, wherein rotating the removable cap one quarter revolution in a first direction disengages the cam portion from the cam lock and rotating the removable cap one quarter revolution in a second direction opposite the first direction engages the cam portion with the cam lock.

16. The chalk reel of claim 10, wherein the handle pivots from a rotation position to a locked position, wherein the handle rotates to pay out or receive chalk line from the spool in the rotation position and wherein the handle prevents rotation of the spool in the locked position.

17. The chalk reel of claim 10, wherein the chalk line pays out at a ratio greater than 1:1, such that for each rotation of the spool the chalk line pays out more than one times a circumference of the spool.

18. A chalk reel comprising:

a housing comprising an outer surface, an internal chamber, a central axis, and an opening;

a marking material located in the internal chamber;

a handle, wherein the handle is adjustable between a rotation position and a plurality of locked positions, wherein, when the handle is in the rotation position, the handle is configured to rotate about the central axis in a clockwise direction and/or a counterclockwise direction, and wherein, when the handle is in one of the plurality of locked positions, the handle is prevented from rotating about the central axis;

a spool supported in the internal chamber of the housing, wherein rotating the handle rotates the spool; and a chalk line comprising a first end extending through the opening in the housing and a second end coupled to the spool.

19. The chalk reel of claim 18, the chalk reel further comprising:

a ring gear coupled to the handle; and a sun gear coupled to the ring gear;

wherein the handle pivots from the rotation position to one of the plurality of locked positions at a locking location on the ring gear, wherein the handle rotates to pay out or receive chalk line from the spool in the rotation position and wherein the handle prevents rotation of the spool in the locked position at a locking location of the ring gear.

20. The chalk reel of claim 18, the chalk reel further comprising:

a hook secured to the first end of the chalk line;
a ring gear coupled to the handle; and
a sun gear coupled to the ring gear;
wherein the chalk line pays out at ratio between 3:1 and 6:1, wherein for each rotation of the handle and the ring gear, the sun gear and the spool have a gear ratio that pays out more than four times a circumference of the spool.

* * * * *